US011839228B2

(12) United States Patent
Castrale et al.

(10) Patent No.: US 11,839,228 B2
(45) Date of Patent: Dec. 12, 2023

(54) SPROUTED POPCORN AND METHOD FOR MAKING SPROUTED POPCORN

(71) Applicant: Conagra Foods RDM, Inc., Chicago, IL (US)

(72) Inventors: Melissa Castrale, Wheaton, IL (US); Andrew Wassinger, Omaha, NE (US); Aghogho Pedro, Roscoe, IL (US); Jairus R. D. David, Omaha, NE (US)

(73) Assignee: CONAGRA FOODS RDM, INC., Chicago, IL (US)

( * ) Notice: Subject to any disclaimer, the term of this patent is extended or adjusted under 35 U.S.C. 154(b) by 412 days.

(21) Appl. No.: 16/720,791

(22) Filed: Dec. 19, 2019

(65) Prior Publication Data

US 2020/0196643 A1 Jun. 25, 2020

Related U.S. Application Data

(60) Provisional application No. 62/866,880, filed on Jun. 26, 2019, provisional application No. 62/783,404, filed on Dec. 21, 2018.

(51) Int. Cl.
*A23L 7/161* (2016.01)
*G01N 33/02* (2006.01)
(Continued)

(52) U.S. Cl.
CPC ............. *A23L 5/19* (2016.08); *A23L 7/161* (2016.08); *G01N 27/223* (2013.01)

(58) Field of Classification Search
CPC .......... A23L 7/152; A23L 7/161; A23L 7/174; A23L 7/178; A23L 7/183; A23L 7/187; A23L 7/196; A23L 7/197; A01C 1/00; A01C 1/02; A01C 1/025; A01G 31/00; A01G 31/02; A01G 31/04; A01G 31/042; A01G 31/045; A01G 31/047; A01G 31/06;
(Continued)

(56) References Cited

U.S. PATENT DOCUMENTS 6,013,863 A * 1/2000 Lundquist .......... C12N 15/8286
800/278
2003/0206996 A1* 11/2003 Leusner ................. B02C 11/08
426/74
(Continued)

FOREIGN PATENT DOCUMENTS

CN 103719991 A * 4/2014 ............... A23L 1/29
RU 2482700 C1 * 5/2013 ............. A23K 50/40

*Primary Examiner* — Herbert K Roberts
(74) *Attorney, Agent, or Firm* — Ryan T. Grace; Advent, LLP

(57) ABSTRACT

Systems and methods for producing sprouted popcorn kernels are provided, which can be popped into sprouted popped popcorn having unique organoleptic qualities. In an embodiment, a system incorporates a germination unit having one or more sensors to track the germination progress of unsprouted popcorn kernels and to automatically transition sprouted popcorn kernels to a drying process to provide dried sprouted popcorn kernels suitable for popping as a ready to eat product or for packaging for consumer popping preparation. The system promotes the preparation of commercial scale sprouted popcorn kernels through tracking of moisture content of the popcorn kernels through one or more processes of sprouted popcorn kernel production.

16 Claims, 7 Drawing Sheets

(51) Int. Cl.
*A23L 5/10* (2016.01)
*G01N 27/22* (2006.01)

(58) Field of Classification Search
CPC .......... G01G 2031/006; G01N 27/048; G01N 27/121; G01N 27/223; G01N 27/605; G01N 5/025; G01N 5/045; G01N 19/10; G01N 21/3554; G01N 22/04; G01N 25/56; G01N 25/58; G01N 25/60; G01N 25/62; G01N 25/64; G01N 25/66; G01N 25/68; G01N 25/70; G01N 31/222; G01N 2223/613

See application file for complete search history.

(56) References Cited

U.S. PATENT DOCUMENTS

| | | | |
|---|---|---|---|
| 2008/0008812 A1* | 1/2008 | Ochiai | A23L 33/105 47/58.1 SE |
| 2009/0130267 A1* | 5/2009 | Hauck | A23K 50/10 47/58.1 SE |
| 2010/0130365 A1* | 5/2010 | Notten | A01C 1/02 504/138 |
| 2014/0093636 A1* | 4/2014 | Fitzgerald | A23L 7/183 426/508 |

* cited by examiner

SPROUTED

UNSPROUTED

SPROUTED POPCORN AND METHOD FOR MAKING SPROUTED POPCORN

CROSS-REFERENCE TO RELATED APPLICATIONS

The present application claims the benefit under 35 U.S.C. § 119(e) of U.S. Provisional Application Ser. No. 62/783,404, entitled SPROUTED POPCORN AND METHOD FOR MAKING SPROUTED POPCORN, filed Dec. 21, 2018, and U.S. Provisional Application Ser. No. 62/866,880, entitled SPROUTED POPCORN AND METHOD FOR MAKING SPROUTED POPCORN, filed Jun. 26, 2019. U.S. Provisional Application Ser. Nos. 62/783,404 and 62/866,880 are hereby incorporated by reference in their entireties.

BACKGROUND

Sprouting a grain changes characteristics of the grain such as its flavor profile, texture, or nutrition. Sprouting a grain breaks down the outer hull, often making the grain more easily digestible, which can also increase the bioavailability and amount of some vitamins.

Popcorn is a popular snack food that is made by heating a specialized popcorn kernel so that the water inside the kernel turns to steam, causing pressure that ruptures the corn hull, and results in an expanded fluffy popped corn.

SUMMARY

This summary is provided solely as an introduction to subject matter that is fully described in the detailed description and drawings. The summary should not be considered to describe essential features nor be used to determine the scope of the claims. Moreover, it is to be understood that both the summary and the detailed description are examples and explanatory only and are not necessarily restrictive of the subject matter claimed.

Aspects of the disclosure pertain to producing sprouted popcorn kernels that provide an ability for popping into sprouted popped popcorn having unique organoleptic qualities. In an embodiment, a system incorporates a germination unit having one or more sensors to track the germination progress of unsprouted popcorn kernels and to automatically transition sprouted popcorn kernels to a drying process to provide dried sprouted popcorn kernels suitable for popping as a ready to eat product or for packaging for consumer popping preparation. The system promotes the preparation of commercial scale sprouted popcorn kernels through tracking of moisture content of the popcorn kernels through one or more processes of sprouted popcorn kernel production.

DETAILED DESCRIPTION

Overview

Figure 1:
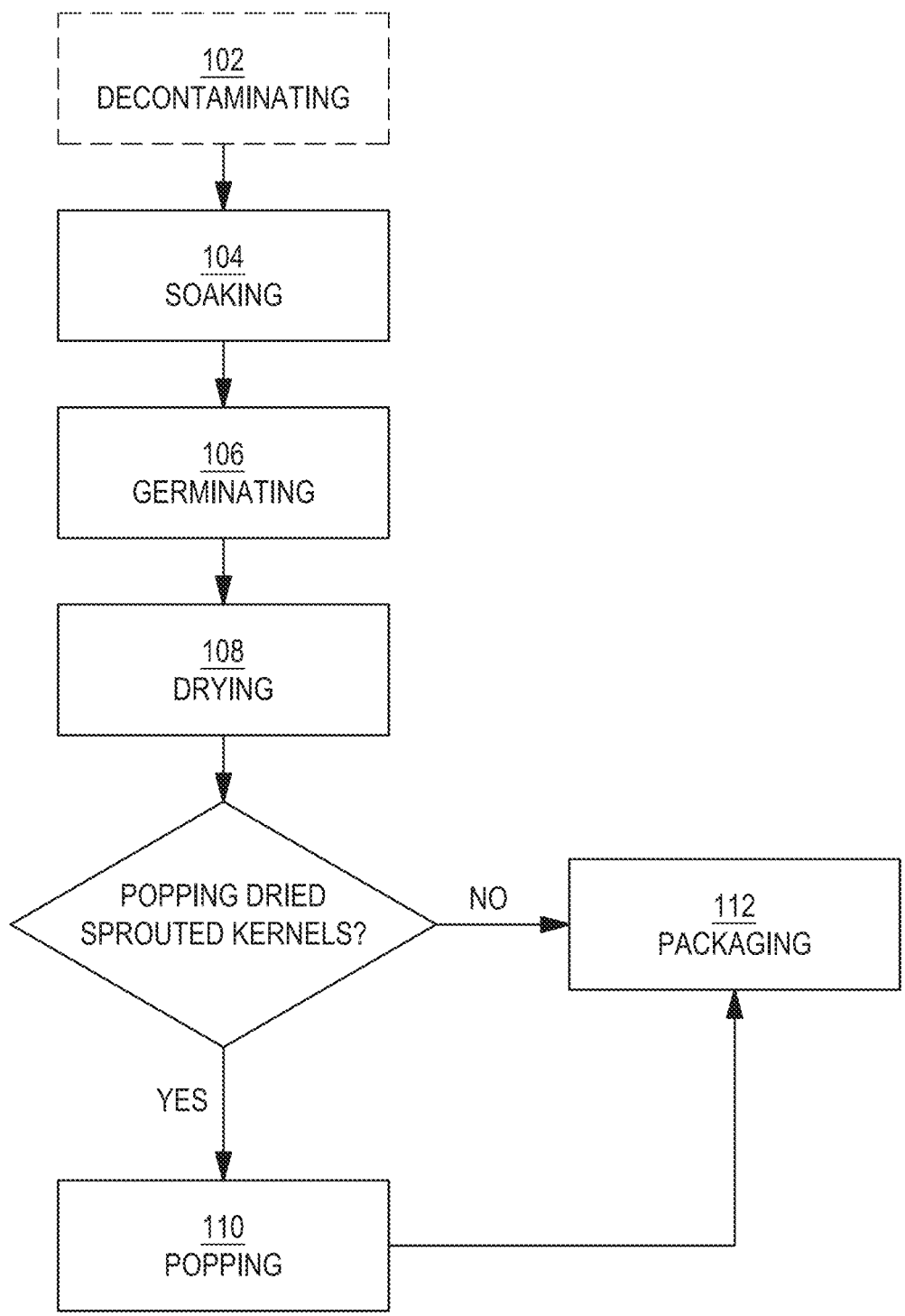
FIG. 1 is a schematic diagram of a process for making sprouted popcorn.

Whole grains provide many nutritive and digestive benefits to consumers by including the same basic components of the kernel harvested from grains. A whole grain includes the bran, the endosperm, and the germ, all or part of which can be encased or surrounded by a husk or protective outer shell. Refined grains lack one or more of these components, for example, by separating the endosperms from the bran and germ at the cost of separating out many nutritive and digestive benefits. The bran is the outer skin of the kernel and provides important antioxidants, vitamins, and fiber. The endosperm typically forms the largest portion of the grain and contains a food supply for the germ. The endosperm provides carbohydrates, proteins, and some vitamins and minerals. The germ is the embryo of the grain and has the potential to sprout into a new plant given suitable growing or sprouting conditions. The germ includes a variety of vitamins, minerals, protein, and fats by containing concentrated oils and nutrients to facilitate the sprouting process.

Sprouting is the natural germination process by which seeds put out shoots. Sprouted whole grains can have altered characteristics of the grain such as its flavor profile, texture, and nutrition as compared to unsprouted grain. For instance, sprouting a grain can break down, soften, or otherwise weaken the outer hull, which can make the grain more easily digestible. Sprouting a grain may also increase the amount of some vitamins and/or their bioavailability during digestion.

However, sprouting a grain poses certain challenges in preparation of food products for consumption. If a grain is permitted to sprout too long, the sprout begins to use up the nutrients stored in the grain to push the shoot farther from the grain, which can result in a decline of the nutrient content of the sprouted grain. Additionally, the conditions for sprouting a grain can be similar to conditions that facilitate bacterial pathogen growth. The general sprouting process involves soaking the grain in water or another liquid to increase the moisture content and bring the grains out of dormancy. The soaked grains are then rinsed, drained, and kept moist until the shoots (sprouts) begin to emerge. As such, the sprouting process introduces additional antimicrobial challenges for food preparation of the sprouted grain as compared with unsprouted grain food products.

Sprouting a grain poses additional challenges for popcorn. Popcorn is made by heating the corn kernel so that the water inside the kernel turns to steam, causing pressure that ruptures the corn hull, and produces the expanded fluffy popped corn. One issue for making sprouted popcorn is that if popcorn is sprouted to the extent that the sprout extends outside the kernel (e.g., acrospires forming), the sprout may burn during the popping process, which creates undesirable taste, odor, and appearance. Another issue is the moisture of the pre-popped corn kernel. Moisture levels to influence sprouting are too high to promote popping. If the moisture remains too high, then the popcorn will not pop. Accordingly, the process for making sprouted popcorn may include a drying step. However, if the drying step is conducted so that the moisture of the final pre-popped popcorn is too low, then the desired textural qualities will not be achieved. These challenges are magnified for commercial-scale throughput of sprouted grain food products, particularly with ensuring proper process steps for microbial control, sprouting conditions, drying conditions, and the like, for batch sizes on the order of hundreds of pounds of popcorn kernels.

Sprouted popcorn kernels and food products thereof and systems and methods for production of sprouted popcorn kernels and food products thereof are provided herein. In an embodiment, a system incorporates a germination unit having one or more sensors to track the germination progress of unsprouted popcorn kernels and to automatically transition sprouted popcorn kernels to a drying process to provide dried sprouted popcorn kernels suitable for popping as a ready to eat product or for packaging for consumer popping preparation. The system promotes the preparation of commercial scale sprouted popcorn kernels through tracking of moisture content of the popcorn kernels through one or more processes of sprouted popcorn kernel production.

Terminology & Aspects of the Disclosure

As used herein the terms "germination" and "sprouting" mean the process by which a seed ends dormancy and begins to grow into a plant.

The term "popped popcorn" as used herein generally refers to popped popcorn kernels having undergone a heating procedure to burst the hull of the kernel as a result of internal steam pressure.

The term "kernel" means unpopped or pre-popped popcorn, such as unpopped or pre-popped popcorn kernels removed and isolated from a corn cob.

The term "room temperature" means a temperature from about 20° C. to 30° C., from about 23° C. to 27° C., generally about 25° C.

The term "about" used with reference to numerical values refers to numbers including the referenced number and numbers having functional equivalence to the referenced number.

Aspects of the disclosure include sprouted popcorn kernels, sprouted popped popcorn, a ready to eat (RTE) sprouted popped popcorn product, a microwavable sprouted popcorn kernel product, and processes to make sprouted popcorn kernels and sprouted popped popcorn. In one aspect, the disclosure includes sprouted popcorn kernels and methods to make the same. In one aspect, the sprouted popcorn kernels are provided in a microwavable package. In one aspect, the disclosure includes sprouted popped popcorn and methods to make such. In one aspect, the sprouted popped popcorn is a packaged ready to eat (RTE) product. In one aspect, the sprouted popcorn kernels and popped popcorn are sourced from a hybrid popcorn seed variety, although generally any type of popcorn can be used. In one aspect, the sprouted popcorn kernels are made from a process including the steps of soaking, germination, and drying. In one aspect, the sprouted popped popcorn is made from a process including the steps of soaking, germination, drying, and popping.

Processes and Systems for Making Sprouted Popcorn

Figure 2:
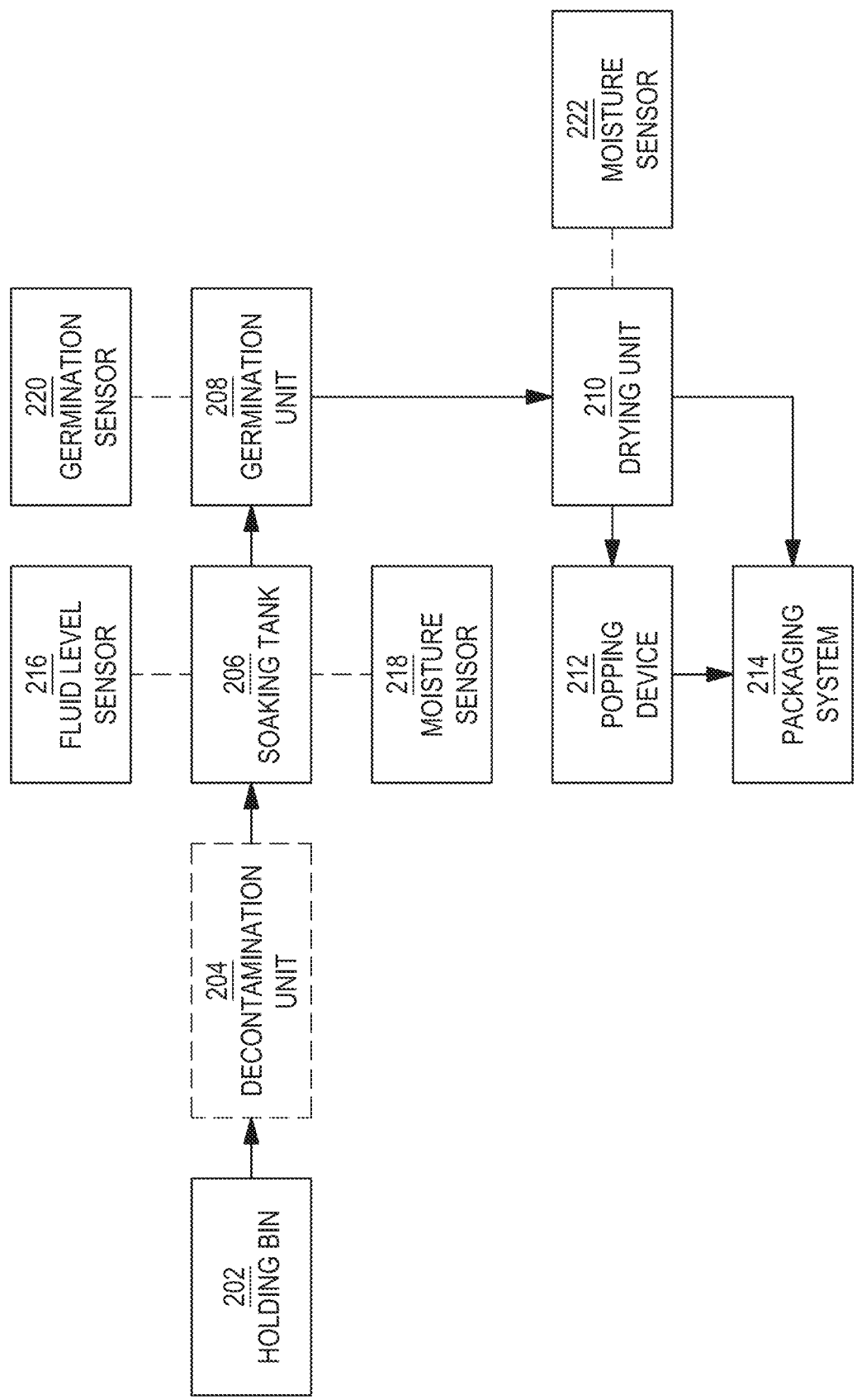
FIG. 2 is a schematic diagram of a high throughput system for making sprouted popcorn.
Figure 3:
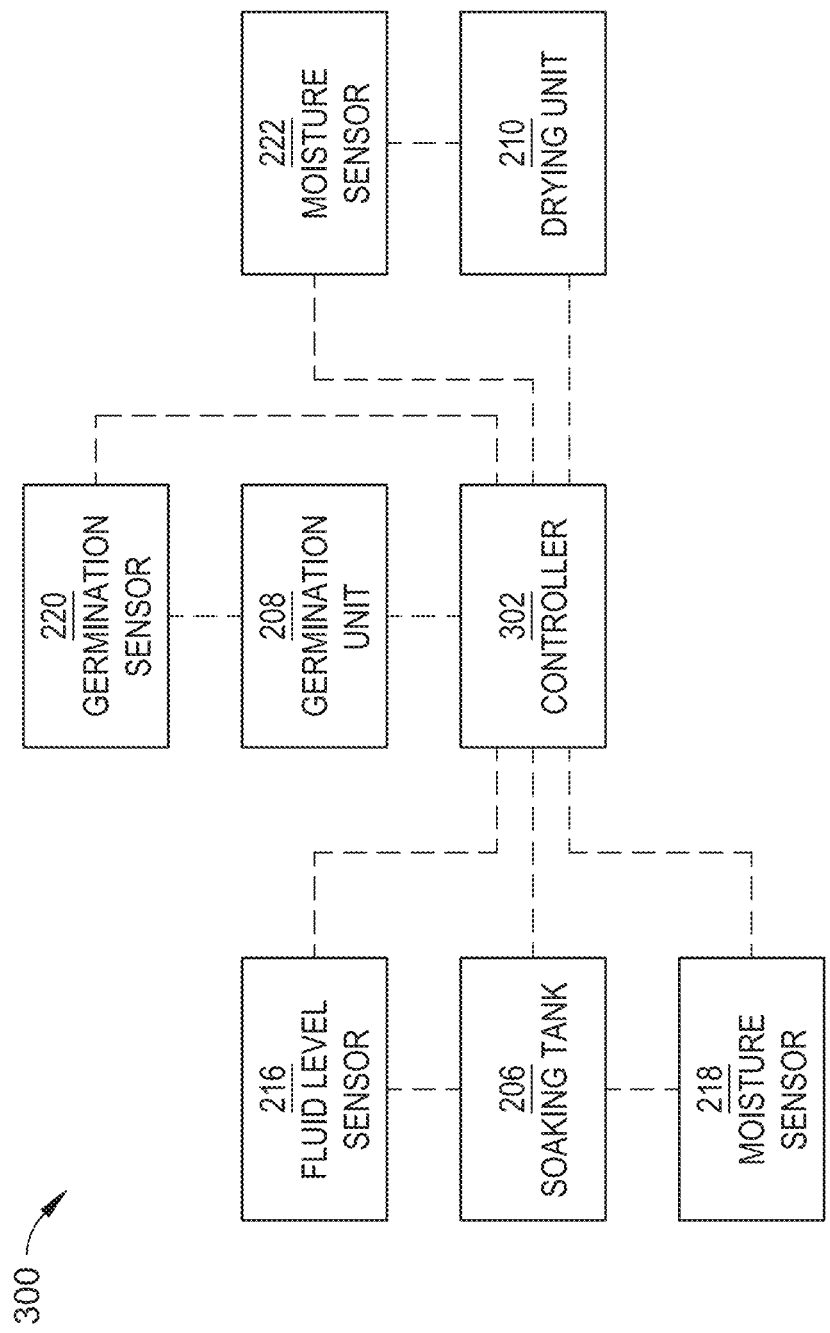
FIG. 3 is a schematic diagram of a control system for automatic control of the high throughput system of FIG. 2.

Referring generally to FIGS. 1-3, example processes and systems for making sprouted popcorn kernels and sprouted popped popcorn are shown in accordance with example implementations of the present disclosure. An overview of an example process 100 for making sprouted popped popcorn is provided in FIG. 1, an example high throughput system 200 for making sprouted popcorn kernels and sprouted popped popcorn is provided in FIG. 2, and an example control system 300 for automating production aspects of the high throughput system 200 is provided in FIG. 3. The processes and systems of FIGS. 1-3 generally involve steps to receive and condition popcorn kernels to facilitate controlled germination of the kernel to provide a sprouted popcorn kernel suitable for popping into sprouted popped popcorn having specific organoleptic properties (e.g., described further herein with reference to FIGS. 5-7). The popcorn kernels can include a variety of popcorn kernels and hybrid popcorn kernels having a hull thickness to retain the steam pressure for a period of time suitable to gelatinize the starch before rupturing and producing the popped kernel.

The process 100 of FIG. 1 generally includes steps of decontaminating (optional) 102, soaking 104, germinating 106, drying 108, and popping 110. Kernels suitable for use in process 100 can be of a popcorn or hybrid variety having the hull characteristics described above. The moisture content of the kernels prior to further processing can be in a range from about 10% to about 16% by weight. For example, the weight percentage of moisture in the kernels can be from about 10%, 10.5%, 11%, 11.5%, 12%, 12.5%, 13%, 13.5%, 14%, 14.5%, 15%, 15.5%, and 16% to about 10%, 10.5%, 11%, 11.5%, 12%, 12.5%, 13%, 13.5%, 14%, 14.5%, 15%, 15.5%, and 16%. In an example implementation, the weight percentage of moisture in the kernels is from about 13% to about 14% by weight. For instance, the weight percentage of moisture in the kernels can be about 13.5% by weight. Following receipt of the popcorn kernels, the kernels can be decontaminated or otherwise cleaned in step 102 through interaction between the kernels and antimicrobial agents, food-grade cleaning agents and surfactants, or combinations thereof. For example, step 102 can include treating the unpopped kernels with a decontaminating agent such as sodium hypochlorite (NaOCl) or NEO-PURE™ (an organic liquid decontamination solution derived from plants). A number of decontamination methods and agents can be employed, so long as they meet efficacy and safety standards and do not interfere with further processing of the kernels or popping of the kernels.

The soaking step 104 prepares the unpopped kernel for germinating by providing conditions for dormant seeds to begin the germination process. During the soaking step 104, the kernels are exposed to water or other fluid to soften the hull and increase the fluid content of the kernel in preparation for germination, which typically involves fluid contents much higher than those of the initial kernels. The weight percentage of fluid in the kernels following the soaking step 104 can be in a range from about 25% to about 35%. For example, the weight percentage of moisture in the kernels following the soaking step 104 can be from about 25%, 25.5%, 26%, 26.5%, 27%, 27.5%, 28%, 28.5%, 29%, 29.5%, 30%, 30.5%, 31%, 31.5%, 32%, 32.5%, 33%, 33.5%, 34%, 34.5%, and 35% to about 25%, 25.5%, 26%, 26.5%, 27%, 27.5%, 28%, 28.5%, 29%, 29.5%, 30%, 30.5%, 31%, 31.5%, 32%, 32.5%, 33%, 33.5%, 34%, 34.5%, and 35%. In an example implementation, the weight percentage of moisture in the kernels following the soaking step 104 is from about 29% to about 33% by weight. For instance, the weight percentage of moisture in the kernels following the soaking step 104 can be about 31%. During the soaking step 104, the kernels generally absorb moisture from the soaking solution, however the conditions for the soaking step 104 permit the kernel hulls to generally remain intact to provide kernels suitable for a later popping process (e.g., popping step 110). The soaking step 104 can involve one or more conditions to which the kernels are exposed prior to the germinating step 106. For example, kernels can be introduced to a soaking chamber for a duration to soften the hull and increase the fluid content of the kernel in preparation for germination. The soaking chamber can be maintained at a particular temperature, or have a varied temperature or gradient temperature during one or more soaking periods. The soaking step 104 can also include introduction of one or more additives to the soaking fluid. For example, flavoring, nutrients, or other agents can be added to the soaking fluid for absorption by the kernels. Such additives can influence conditions for germination, provide flavoring or nutrients to an end sprouted popped popcorn, or the like.

Following the soaking step 104, the process 100 proceeds to the germinating step 106 where the soaked kernels are introduced to a controlled environment at a temperature and relative humidity for a time sufficient for the kernels to germinate and produce sprouted kernels. The conditions and duration of the germinating step 106 within the controlled environment can depend on the degree of germination preferred. For example, the germinating step 106 occurs mostly in the absence of light where the popcorn kernels are germinated until the kernel hull thins but the developing sprout does not crack the kernel hull. The hull of the germinated kernels may be translucent due to the thinned state, but remains intact to prevent formation of acrospires. For instance, if acrospires were present external to the hull, the acrospires could burn during subsequent popping processes of the sprouted kernels, resulting in undesirable taste, odor, and appearance. Additionally, the germinating step 106 can control germination conditions to prevent the kernel from sprouting too long, where the sprout begins to use up the nutrients stored in the grain to push the shoot farther from the grain. The germinating step 106 can include maintaining the controlled environment at room temperature conditions, with a relative humidity ranging from about 30%, 31%, 32%, 33%, 34%, 35%, 36%, 37%, 38%, 39%, 40%, 41%, 42%, 43%, 44%, 45%, 46%, 47%, 48%, 49%, and 50% to about 30%, 31%, 32%, 33%, 34%, 35%, 36%, 37%, 38%, 39%, 40%, 41%, 42%, 43%, 44%, 45%, 46%, 47%, 48%, 49%, and 50%. In an aspect, the germinating step 106 includes maintaining the controlled environment at room temperature conditions with a relative humidity from about 35% to about 45%. For example, the germinating step 106 can include maintaining the controlled environment at room temperature conditions with a relative humidity of about 40%.

Following the germinating step 106, the process 100 proceeds to the drying step 108 where moisture is removed from the sprouted kernels to facilitate storage or popped sprouted popcorn production. The drying step 108 can include introducing the sprouted kernels into a heated environment, passing gas or heated gas over the sprouted kernels, or other drying process to remove moisture from the sprouted kernels. The drying step 108 can include removing moisture from the sprouted kernels to provide a moisture content by weight in the sprouted kernels ranging from about 14%, 14.1%, 14.2%, 14.3%, 14.4%, 14.5%, 14.6%, 14.7%, 14.8%, 14.9%, 15%, 15.1%, 15.2%, 15.3%, 15.4%, 15.5%, 15.6%, 15.7%, 15.8%, 15.9%, and 16% to about 14%, 14.1%, 14.2%, 14.3%, 14.4%, 14.5%, 14.6%, 14.7%, 14.8%, 14.9%, 15%, 15.1%, 15.2%, 15.3%, 15.4%, 15.5%, 15.6%, 15.7%, 15.8%, 15.9%, and 16%. In an aspect, the drying step 108 includes removing moisture from the sprouted kernels to provide a moisture content by weight in the sprouted kernels ranging from about 14.5% to about 15.5%. For example, the drying step 108 can include removing moisture from the sprouted kernels to provide a moisture content by weight in the sprouted kernels of about 15%.

Following drying, the dried sprouted kernels can be either packaged or popped, depending on the desired food product (e.g., dried sprouted kernels or sprouted popped popcorn, respectively). If the dried sprouted kernels are the desired food product, the process 100 proceeds to a packaging step 112 in which the dried sprouted kernels are introduced to food packaging, such as glass containers (e.g., jars, bottles, etc.), plastic containers (e.g., bags, bins, vials, etc.), microwavable popcorn bags having expandable gussets (e.g., as described in U.S. Pat. No. 9,868,581, incorporated herein by reference), or other packaging, such as according to commercial aseptic packaging processes or the like. Alternatively or additionally, the dried sprouted kernels can be popped in the popping step 110 before being packaged as a ready to eat (RTE) product. The popping step 110 heats the moisture within the dried sprouted kernels to induce steam pressure within the hull and gelatinize the starch before rupturing and producing the sprouted popped popcorn. The popping step 110 can utilize one or more processes for heating the dried sprouted kernels. For example, the popping step 110 can include one or more of heated oil, heated air, microwave radiation, or the like to induce popping of the dried sprouted kernels. In an aspect, the popping step 110 utilizes an air popping process without added oil to provide sprouted popped popcorn having a dense and crunchy texture. For instance, added oil can reduce the crunch of the sprouted popped popcorn by having the starch absorb a portion of the oil.

Referring now to FIG. 2, a high throughput system 200 for making sprouted popcorn is provided. The system 200 is shown including a holding bin 202, a decontamination unit 204, a soaking tank 206, a germination unit 208, a drying unit 210, a popping device 212, and a packaging system 214 to receive and store unsprouted popcorn kernels, prepare the unsprouted popcorn kernels for germination, germinate the unsprouted popcorn kernels to produce sprouted kernels, and to pop and/or package the sprouted kernels. The system 200 includes a control system (e.g., control system 300 shown in FIG. 3) to track process and kernel conditions and automatically transition the system 200 from one operating state to a next operating state based on sensed process and/or kernel conditions. The control system 300 includes a controller 302 that can include one or more controller units that coordinate operations of the system 200, where multiple controllers can be communicatively connected (e.g., via a network). The holding bin 202 receives and stores popcorn kernels from suppliers for holding at the site of the system 200. The holding bin 202 can include, but is not limited to, a grain silo, a storage tank, a storage bin, a collapsible bulk storage bag (e.g., a 2000 lb. to 3000 lb. capacity bag), or the like, or combinations thereof. The moisture content of the kernels stored in the holding bin 202 can be in a range from about 10% to about 16% by weight. For example, the weight percentage of moisture in the kernels in the holding bin 202 can be from about 10%, 10.5%, 11%, 11.5%, 12%, 12.5%, 13%, 13.5%, 14%, 14.5%, 15%, 15.5%, and 16% to about 10%, 10.5%, 11%, 11.5%, 12%, 12.5%, 13%, 13.5%, 14%, 14.5%, 15%, 15.5%, and 16%. In an example implementation, the weight percentage of moisture in the kernels in the holding bin 202 is from about 13% to about 14% by weight. For instance, the weight percentage of moisture in the kernels in the holding bin 202 can be about 13.5% by weight.

Unsprouted kernels held in the holding bin 202 are transferred to the decontamination unit 204 or to the soaking tank 206 for initial cleaning or to begin conditioning of the kernels for germinating. The unsprouted kernels can be transferred in batches from about 100 lbs., 120 lbs., 140 lbs., 160 lbs., 180 lbs., 200 lbs., 220 lbs., 240 lbs., 260 lbs., 280 lbs., 300 lbs., 320 lbs., 340 lbs., 360 lbs., 380 lbs., 400 lbs., 420 lbs., 440 lbs., 460 lbs., 480 lbs., and 500 lbs. to about 100 lbs., 120 lbs., 140 lbs., 160 lbs., 180 lbs., 200 lbs., 220 lbs., 240 lbs., 260 lbs., 280 lbs., 300 lbs., 320 lbs., 340 lbs., 360 lbs., 380 lbs., 400 lbs., 420 lbs., 440 lbs., 460 lbs., 480 lbs., and 500 lbs. In an example implementation, the batch size transferred from the holding bin 202 is from about 250 lbs. to about 400 lbs. For instance, the batch size transferred from the holding bin 202 can be about 340 lbs. However, the system 200 is not limited to such batch sizes, where the system 200 can be utilized for smaller batches (e.g., less than 100 lbs.) or larger batches (e.g., in excess of 500 lbs.).

Unsprouted kernels fed to the decontamination unit 204 can be introduced to an aperture in the decontamination unit 204 (e.g., open end, hatch entry in a side surface, etc.) via belt conveyor, auger, hopper, or the like, or combinations thereof. In an aspect, a decontamination fluid is present in the decontamination unit 204 during introduction of the unsprouted kernels. Alternatively or additionally, decontamination fluid is introduced to the decontamination unit 204 with the unsprouted kernels present therein. The kernels can be decontaminated or otherwise cleaned in the decontamination unit 204 through interaction between the kernels and antimicrobial agents, food-grade cleaning agents and surfactants, or combinations thereof. For example, the decontamination fluid can include one or more of sodium hypochlorite (NaOCl), NEO-PURE™, or another food grade decontamination agent which maintains the structural integrity of the hull of the kernels to permit popping at the popping device 212 or by an end consumer. The decontamination fluid can include sodium hypochlorite at a range from about 2000 ppm, 3000 ppm, 4000 ppm, 5000 ppm, 6000 ppm, 7000 ppm, 8000 ppm, 9000 ppm, 10,000 ppm, 11,000 ppm, 12,000 ppm, 13,000 ppm, 14,000 ppm, 15,000 ppm, 16,000 ppm, 17,000 ppm, 18,000 ppm, 19,000, and 20,000 ppm to about 2000 ppm, 3000 ppm, 4000 ppm, 5000 ppm, 6000 ppm, 7000 ppm, 8000 ppm, 9000 ppm, 10,000 ppm, 11,000 ppm, 12,000 ppm, 13,000 ppm, 14,000 ppm, 15,000 ppm, 16,000 ppm, 17,000 ppm, 18,000 ppm, 19,000, and 20,000 ppm. The concentration of decontamination agent and time of exposure can depend upon each other, such as for example, higher concentrations of decontamination agent can be exposed to the kernels for less time than lower concentrations of decontamination agent. In an example implementation, the decontamination fluid includes 2000 ppm sodium hypochlorite with a contact time of 18 minutes with the kernels within the decontamination unit 204. In an example implementation, the decontamination fluid includes 5000 ppm NEO-PURE™ sprayed or otherwise applied to the kernels for a contact time of about 30 seconds to about 60 seconds prior to decomposition of the NEO-PURE™. The system 100 can include a resting period following decontamination prior to soaking. The resting period can be from about 30 minutes to about 120 minutes. For instance, the resting period can be about one hour.

Following decontamination, the kernels and the decontamination fluid are separated and the kernels are transferred to the soaking tank 206 to prepare the unsprouted kernels for germinating. Separation of the kernels and the decontamination fluid can include draining the decontamination fluid from an outlet in the decontamination unit 204, decomposition of the decontamination fluid (e.g., for use of NEO-PURE™), removal of the kernels from the decontamination unit 204, or combinations thereof. In implementations, portions of the decontamination process and the soaking process are conducted within the same vessel (e.g., the decontamination unit 204 and the soaking tank 206 share one or more common regions). Alternatively, the decontamination unit 204 and the soaking tank 206 are distinct vessels or regions. The soaking tank 206 has a volume suitable to hold the kernels and a soaking fluid (e.g., water, water with added materials, etc.) through one or more stages of soaking. The unsprouted kernels can be introduced to an aperture in the soaking tank 206 (e.g., open end, hatch entry in a side surface, etc.) via belt conveyor, auger, hopper, fluidized transfer of a kernel slurry, or the like, or combinations thereof. In an aspect, a soaking fluid is present in the soaking tank 206 during introduction of the unsprouted kernels. Alternatively or additionally, soaking fluid is introduced to the soaking tank 206 with the unsprouted kernels present therein. In an aspect, the soaking tank 206 includes a fluid level sensor 216 to measure a level of soaking fluid present in the interior of the soaking tank 206. The fluid level sensor 216 can include, but is not limited to an ultrasonic sensor, an optical sensor, or other sensor, configured to measure a level or amount of fluid within the soaking tank 206. A system controller (e.g., controller 302 in FIG. 3) for the system 200 can receive an output from the fluid level sensor 216 to coordinate operation of a pump or other device to introduce fluid to the soaking tank (e.g., when the output from the fluid level sensor 216 indicates a fluid level under a threshold fluid level) or remove fluid from the soaking tank 206 (e.g., when the output from the fluid level sensor 216 indicates a fluid level above a threshold fluid level). In an implementation, the threshold fluid level ranges from about one inch to about six inches from a bottom surface of the soaking tank 206. For example, the threshold fluid level can be about two inches from a bottom surface of the soaking tank 206. In an implementation, the threshold fluid level ranges from about one inch to about six inches from a top surface of kernels present in the soaking tank 206. For example, the threshold fluid level can be about two inches from a top surface of kernels present in the soaking tank 206.

While in the soaking tank 206, the kernels are contacted with the soaking fluid to soften the hull and increase the fluid content of the kernel in preparation for germination. The soaking process within the soaking tank 206 can involve one or more soaking stages, one or more of which can have different lighting conditions. For example, differing soaking stages can include different temperatures or times of soaking or lighting exposure. In an aspect, the soaking tank 206 is controlled (e.g., via controller 302) to provide a one stage soaking process where the kernels are contacted with the soaking fluid for a period of time at a substantially constant temperature. For example, the soaking tank 206 can be controlled to maintain substantially room temperature conditions for a duration ranging from about 10 hours to about 14 hours. For instance, the soaking tank 206 can be controlled to maintain substantially room temperature conditions for a duration of about 12 hours.

In an aspect, the soaking tank 206 can be controlled (e.g., via controller 302) to provide a multi-stage soaking process. For example, the multi-stage soaking process can include an activation stage and a steeping stage. The activation stage generally involves soaking the kernels in soaking fluid at a higher temperature than the steeping stage and for a shorter period of time than the steeping stage provide an initial activation or "waking up" of the dormant seeds. In an aspect, the activation stage controls the soaking tank 206 to have a temperature ranging from about 30° C., 32° C., 34° C., 36° C., 38° C., 40° C., 42° C., 44° C., 46° C., 48° C., 50° C., 52° C., 54° C., 56° C., 58° C., and 60° C. to about 30° C., 32° C., 34° C., 36° C., 38° C., 40° C., 42° C., 44° C., 46° C., 48° C., 50° C., 52° C., 54° C., 56° C., 58° C., and 60° C. In an example implementation, the activation stage involves a temperature ranging from about 39° C. to about 45° C. For example, the activation stage can control the temperature of the soaking tank 206 to about 42° C. The duration of the activation stage can range from about 15 minutes, 30 minutes, 45 minutes, 60 minutes, 75 minutes, 90 minutes, 105 minutes, and 120 minutes to about 15 minutes, 30 minutes, 45 minutes, 60 minutes, 75 minutes, 90 minutes, 105 minutes, and 120 minutes. For example, the activation stage can range from about 15 minutes to about 60 minutes to activate the dormant kernels prior to the steeping stage. The activation stage can be performed in the absence of light. Following the activation stage, the temperature of the soaking tank 206 is reduced for the steeping stage. In an aspect, cooler water is added to the soaking tank 206. For example, the controller 302 can automatically control a pump or other device to permit the addition of cooler water (e.g., room temperature water) to the soaking tank 206 following the activation stage. In implementations, the controller 302 utilizes a coordinated clock or timer to determine the end of the activation stage. In an aspect, the steeping stage involves permitting the soaking tank 206 to achieve about room temperature for a duration ranging from about 4 hours, 4.5 hours, 5 hours, 5.5 hours, 6 hours, 6.5 hours, 7 hours, 7.5 hours, and 8 hours to about 4 hours, 4.5 hours, 5 hours, 5.5 hours, 6 hours, 6.5 hours, 7 hours, 7.5 hours, and 8 hours. In an example implementation, the soaking tank 206 maintains about room temperature soaking conditions following the activation stage for a duration of about 6 hours to about 7 hours. For example, the steeping stage has a duration of about 6.5 hours. The steeping stage can be performed in the presence of light.

In an aspect, the system 200 includes a moisture sensor 218 to facilitate operation of the soaking tank 206. The moisture sensor 218 can include a non-contact sensor (e.g., a non-contact infrared sensor) or a contact sensor to measure a moisture of one or more kernels treated by the soaking tank 206. For example, one or more kernels can be removed from the soaking fluid (e.g., via paddle wheel, conveyor, or other automated structure), coordinated by a controller of the system 200 (e.g., controller 302), to bring the kernel in proximity to the moisture sensor 218. The controller 302 can receive an output from the moisture sensor 218 to coordinate operation of a pump, drain, conveyor, or other device to separate the soaked kernels from the soaking fluid (e.g., via removal of one or more of the soaking fluid or the kernels from the soaking tank 206) when the output indicates that the measured moisture meets a threshold moisture content.

In an aspect, the threshold moisture content can be a weight percentage of fluid in the kernels in a range from about 25% to about 35%. For example, the threshold moisture content can be a weight percentage of moisture in the kernels following soaking in the soaking tank 206 from about 25%, 25.5%, 26%, 26.5%, 27%, 27.5%, 28%, 28.5%, 29%, 29.5%, 30%, 30.5%, 31%, 31.5%, 32%, 32.5%, 33%, 33.5%, 34%, 34.5%, and 35% to about 25%, 25.5%, 26%, 26.5%, 27%, 27.5%, 28%, 28.5%, 29%, 29.5%, 30%, 30.5%, 31%, 31.5%, 32%, 32.5%, 33%, 33.5%, 34%, 34.5%, and 35%. In an example implementation, the threshold moisture content is a weight percentage of moisture in the kernels from about 29% to about 33% by weight. For instance, the threshold moisture content can be a weight percentage of moisture in the kernels of about 31%. Operation of the soaking tank 206 permits the kernels to absorb moisture from the soaking fluid while permitting the kernel hulls to generally remain intact to provide kernels suitable for a later popping process (e.g., at the popping device 212 or by an end consumer). In an aspect, the soaking tank 206 includes an impeller or other agitation system to stir or otherwise agitate the kernels within the soaking tank 206 on a continuous or intermittent basis. For example, the soaking tank 206 can agitate the kernels for a first duration (e.g., a first portion of the steeping stage, such as a 30 minute duration) and can prevent agitation of the kernels for a second duration (e.g., a second portion of the steeping stage, such as a 6 hour duration following the 30 minute agitation period). In an aspect, all or a portion of the steeping stage is performed in the presence of light.

Following soaking, the kernels are separated from the soaking fluid and transferred to the germination unit 208 for controlled sprouting of the soaked kernels. Separation of the kernels and the soaking fluid can include draining the soaking fluid from an outlet in the soaking tank 206, removal of the kernels from the soaking tank 206, or combinations thereof, operated under control by the control system 300. In implementations, portions of the soaking process and the germinating process are conducted within the same vessel (e.g., the soaking tank 206 and the germination unit 208 share one or more common regions). Alternatively, the soaking tank 206 and the germination unit 208 are distinct vessels or regions. A rinse procedure can be conducted following soaking. For example, one or more of the soaking tank 206 or the germination unit 208 can include a rinse fluid port to introduce a rinse fluid to the soaked kernels prior to germinating the kernels. In an aspect, the germination unit 208 supports the soaked kernels on one or more porous trays to facilitate air circulation past the kernels. Alternatively or additionally, the germination unit 208 can include one or more fans or air circulation devices to facilitate air circulation past the kernels.

The germination unit 208 controls the conditions to which the soaked kernels are maintained in order to germinate and produce sprouted kernels. For instance, the soaked kernels are exposed to an environment having controlled humidity, temperature, and lighting to germinate the kernels until the kernel hull thins, but the developing sprout does not crack the kernel hull, preventing the formation of acrospires. For instance, if acrospires were present external to the hull, the acrospires could burn during subsequent popping processes of the sprouted kernels in the popping device 212 or by an end consumer, resulting in undesirable taste, odor, and appearance. Additionally, the germination unit 208 controls germination conditions to prevent the kernel from sprouting too long, where the sprout begins to use up the nutrients stored in the grain to push the shoot farther from the grain.

In particular, the germination unit 208 controls the relative humidity and light exposure of an internal volume in which the soaked kernels are maintained during germination. In an aspect, the germination unit 208 maintains a dark environment (e.g., substantially devoid of light) during the germinating process. The germination unit 208 can include humidifier units and/or dehumidifier units to maintain a controlled environment for the soaked kernels with a relative humidity ranging from about 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, and 70% to about 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, and 70%. In an aspect, the germination unit 208 maintains the controlled environment with a relative humidity from about 35% to about 45%. For example, the germination unit 208 can maintain the controlled environment with a relative humidity of about 40%. In an aspect, the germination unit 208 operates at room temperature conditions.

The germination unit 208 also controls the duration of the germinating process. In an aspect, the germination unit 208 maintains the controlled environment of the soaked kernels for a specified duration to provide at least 90% germination of kernels where the kernel hull thins, but the developing sprout does not crack the kernel hull, preventing the formation of acrospires. In an aspect, the germination unit 208 automatically maintains the controlled environment (e.g., facilitated by the controller 302) to provide at least 95% germination of the soaked kernels. For example, the germination unit 208 can hold the soaked kernels within the germination unit for a duration ranging from about 8 hours, 8.5 hours, 9 hours, 9.5 hours, 10 hours, 10.5 hours, 11 hours, 11.5 hours, 12 hours, 12.5 hours, 13 hours, 13.5 hours, 14 hours, 14.5 hours, 15 hours, 15.5 hours, and 16 hours to about 8 hours, 8.5 hours, 9 hours, 9.5 hours, 10 hours, 10.5 hours, 11 hours, 11.5 hours, 12 hours, 12.5 hours, 13 hours, 13.5 hours, 14 hours, 14.5 hours, 15 hours, 15.5 hours, and 16 hours. The germination unit 208 can include a timer communicatively coupled with the controller of the system 200 to coordinate operation of the germination unit 208 with a system clock to automatically stop the germinating process upon expiration of a pre-set time.

The germination unit 208 can include one or more germination sensors 220 used to control the duration of the germinating process in addition to or as an alternative to a timer. For instance, the germination sensor 220 can include one or more of an optical sensor or a moisture sensor, the output of which is used to control when the germination unit 208 ceases providing the controlled environment for the germinating process. The optical sensor can include a camera, an optical coherence tomography (OCT) device, or other sensor configured to measure surface or sub-surface features of the kernels during the germinating process. The optical sensor can be activated on a continuous or intermittent basis to measure progress of the germinating process according to optical measurements. In an aspect, the optical measurements are compared against reference optical characteristics indicative of germination progress sufficient to provide sprouted kernels having a thinned and/or translucent hull that remains intact (e.g., without significant acrospire development). For example, the controller 302 can be communicatively coupled with the optical sensor to compare output of the optical sensor with the reference optical characteristics to determine whether the measured kernel(s) have undergone a sufficient duration of germination. The reference optical characteristics can include, but are not limited to, a number of acrospires present, a percentage of acrospires present, a hull opacity, a range of hull opacity, and the like. When the optical sensor output meets a threshold reference optical characteristic (e.g., an optical measurement of the popcorn kernels at least substantially matches (e.g., within two standard deviations) an optical measurement of sprouted popcorn kernels prior to acrospire formation, one or more acrospires are detected, a hull opacity is reached indicating translucent hull characteristics, etc.), the controller 302 transmits control signals to the germination unit 208 to stop the germinating process and to initiate transfer of the sprouted kernels to the drying unit 210.

In an aspect, the moisture sensor of the germination sensor 220 provides an indicator to determine whether the measured kernel(s) has/have undergone a sufficient duration of germination. For example, if the optical sensor output meets the threshold reference optical characteristic (e.g., as processed by the controller 302), the output of the moisture sensor can be checked to determine whether the moisture of measured kernel(s) is/are within a threshold moisture content for kernels at the end of the germinating process (e.g., as processed by the controller 302). In an aspect, the germinating process is terminated only when each of the optical sensor output and the moisture sensor output are within the respective threshold values. Alternatively, moisture measurements from the moisture sensor are used to trigger the end of the germinating process at the germination unit 208. The moisture sensor can include a non-contact sensor (e.g., a non-contact infrared sensor) or a contact sensor to measure a moisture of one or more kernels treated by the germination unit 208. For example, one or more kernels can be removed from the tray of the germination unit 208 (e.g., via conveyor or other automated structure), coordinated by a controller of the system 200, to bring the kernel in proximity to the moisture sensor. Alternatively or additionally, the moisture sensor is moved into proximity of the kernels above the tray, below the tray (e.g., with an aperture or mesh on a bottom surface of the tray), or combinations thereof. The controller 302 can receive an output from the moisture sensor of the germination sensor 220 to coordinate operation of a conveyor, air handler, or other device to transfer the sprouted kernels to the drying unit 210 or being drying at the germination unit 208 (e.g., when germinating and drying steps are consolidated at the germination unit 208) when the output from the germination sensor 220 indicates that the measured moisture meets a threshold moisture content. In an aspect, the threshold moisture content following germination can be a weight percentage of fluid in the sprouted kernels in a range from about 20% to about 35%. For example, the threshold moisture content can be a weight percentage of moisture in the sprouted kernels following germinating in the germination unit 208 from about 20%, 20.5%, 21%, 21.5%, 22%, 22.5%, 23%, 23.5%, 24%, 24.5%, 25%, 25.5%, 26%, 26.5%, 27%, 27.5%, 28%, 28.5%, 29%, 29.5%, 30%, 30.5%, 31%, 31.5%, 32%, 32.5%, 33%, 33.5%, 34%, 34.5%, and 35% to about 20%, 20.5%, 21%, 21.5%, 22%, 22.5%, 23%, 23.5%, 24%, 24.5%, 25%, 25.5%, 26%, 26.5%, 27%, 27.5%, 28%, 28.5%, 29%, 29.5%, 30%, 30.5%, 31%, 31.5%, 32%, 32.5%, 33%, 33.5%, 34%, 34.5%, and 35%.

Following germination, the sprouted kernels are ready for drying to provide a dried sprouted kernel having a final moisture content suitable for popping (e.g., at the popping device 212) or to facilitate storage for a later popping process (e.g., by an end consumer). In implementations, portions of the germinating process and the drying process are conducted within the same vessel (e.g., the germination unit 208 and the drying unit 210 share one or more common regions). Alternatively, the germination unit 208 and the drying unit 210 are distinct units or regions. The drying unit 210 can include a heated interior in which the sprouted kernels are positioned and/or through which the sprouted kernels are transferred (e.g., via conveyor). In an aspect, the drying unit 210 includes one or more fans or gas circulators to move gas or heated gas past the sprouted kernels to induce or otherwise facilitate removal of moisture from the sprouted kernels. The drying unit 210 maintains the sprouted kernels within a controlled drying environment to remove moisture from the sprouted kernels to provide a moisture content by weight in the sprouted kernels ranging from about 14% to about 16%. For example, the dried sprouted kernels can have a moisture content by weight ranging from about 14%, 14.1%, 14.2%, 14.3%, 14.4%, 14.5%, 14.6%, 14.7%, 14.8%, 14.9%, 15%, 15.1%, 15.2%, 15.3%, 15.4%, 15.5%, 15.6%, 15.7%, 15.8%, 15.9%, and 16% to about 14%, 14.1%, 14.2%, 14.3%, 14.4%, 14.5%, 14.6%, 14.7%, 14.8%, 14.9%, 15%, 15.1%, 15.2%, 15.3%, 15.4%, 15.5%, 15.6%, 15.7%, 15.8%, 15.9%, and 16%. In an aspect, the drying unit 210 removes moisture from the sprouted kernels to provide a moisture content by weight in the sprouted kernels ranging from about 14.5% to about 15.5%. For example, the drying unit 210 can remove moisture from the sprouted kernels to provide a moisture content by weight in the sprouted kernels of about 15%. In an example implementation, the drying unit 210 operated at about 150° F. (65.6° C.) with about 30,000 cubic feet per minute (CFM) for about two hours. The drying unit 210 can include an agitator, stir device, or other structure to continuously or intermittently mix the sprouted kernels during the drying process. In an aspect, the drying unit 210 maintains a dark environment (e.g., substantially devoid of light) during at least a portion of the drying process.

The drying unit 210 controls the duration of the drying process to provide controlled conditions under which the dried sprouted kernels are produced to provide the desired organoleptic features. For example, the drying unit 210 can include a timer communicatively coupled with the controller 302 to coordinate operation of the drying unit 210 with a system clock to automatically stop the drying process upon expiration of a pre-set time. The drying unit 210 can include one or more moisture sensors 222 used to control the duration of the drying process in addition to or as an alternative to a timer. The moisture sensor 222 can include a non-contact sensor (e.g., a non-contact infrared sensor) or a contact sensor to measure a moisture of one or more sprouted kernels treated by the drying unit 210. For example, one or more sprouts kernels can be removed from the tray of the drying unit 210 (e.g., via conveyor or other automated structure), coordinated by the controller 302, to bring the kernel in proximity to the moisture sensor 222. Alternatively or additionally, the moisture sensor 222 is moved into proximity of the kernels above the tray, below the tray (e.g., with an aperture or mesh on a bottom surface of the tray), or combinations thereof. The controller 302 can receive an output from the moisture sensor 222 to coordinate operation of a conveyor, air handler, or other device of the drying unit 210 to stop the drying process when the output from the moisture sensor 222 indicates that the measured moisture meets a threshold moisture content. In an aspect, the threshold moisture content following drying can be a weight percentage of fluid in the dried sprouted kernels in a range from about 14% to about 16%. For example, the threshold moisture content can be a weight percentage of moisture in the dried sprouted kernels following treatment in the drying unit 210 from about 14%, 14.1%, 14.2%, 14.3%, 14.4%, 14.5%, 14.6%, 14.7%, 14.8%, 14.9%, 15%, 15.1%, 15.2%, 15.3%, 15.4%, 15.5%, 15.6%, 15.7%, 15.8%, 15.9%, and 16% to about 14%, 14.1%, 14.2%, 14.3%, 14.4%, 14.5%, 14.6%, 14.7%, 14.8%, 14.9%, 15%, 15.1%, 15.2%, 15.3%, 15.4%, 15.5%, 15.6%, 15.7%, 15.8%, 15.9%, and 16%. In an aspect, threshold moisture content by weight in the dried sprouted kernels ranges from about 14.5% to about 15.5%. For example, the threshold moisture content by weight in the dried sprouted kernels is about 15%.

Following drying at the drying unit 210, the dried sprouted kernels can be transferred to one or more of the popping device 212 (e.g., to produce a sprouted popped popcorn RTE product) or the packaging system 214 (e.g., to package sprouted unpopped popcorn) via conveyor, auger, or other food handling system. The popping device 212 includes a heater to heat the dried sprouted kernels directly or indirectly, such as through one or more of conductive heat, convection, or radiation. The popping device 212 can utilize one or more of heated oil, heated air, microwave radiation, or the like to induce popping of the dried sprouted kernels. In an aspect, the popping device 212 passes heated air or other gas past the dried sprouted kernels to induce steam pressure within the hull and gelatinize the starch before rupturing and producing the sprouted popped popcorn. The sprouted popped popcorn is then transferred from the popping device 212 to the packaging system 214, such as through action of a conveyor, auger, or other food handling system.

The packaging system 214 receives the dried sprouted kernels from the drying system 210 and the sprouted popped popcorn from the popping device 212 for introducing the respective food products into packaging, such as glass containers (e.g., jars, bottles, etc.), plastic containers (e.g., bags, bins, vials, etc.), microwavable popcorn bags having expandable gussets (e.g., as described in U.S. Pat. No. 9,868,581, incorporated herein by reference), or other packaging, such as according to commercial aseptic packaging processes or the like.

Example 1

Benchtop Germination

An implementation of a benchtop process for producing sprouted popped popcorn was performed in accordance with example implementations of the present disclosure. An Easy Sprout grain sprouter was utilized to aid in the germination process. Moisture content was measured using a Dickey John GAC2100b moisture analyzer. A charge of 250 grams popcorn kernels having a moisture of 13.5 wt. % was soaked for 12 hours in 1000 grams water at room temperature. The bed depth was 2 inches and no agitation was used. The kernels were drained and shaken to remove water. The kernels were returned to the steeping container and left at 18 hours at room temperature and about 40% relative humidity. The bed height was 3 inches (due to water absorption). The container was not agitated. Following germination, the kernels were dried by blotting and then on a metal sheet at 53° C. for 5 to 8 hours at single kernel depth without agitation. Final moisture content was 14 to 15 wt. %; the moisture was checked every 30 minutes starting at 5 hours to ensure moisture was not below 14 wt. %. Dried kernels were stored at ambient temperature in metallized bags. An air popper was used to pop the sprouted kernels. Sprouted popped popcorn was stored in metalized bags.

Example 2

Commercial Scale Germination

An implementation of a commercial scale process of making sprouted popcorn kernels was performed in accordance with example implementations of the present disclosure. The commercial scale example began with 340 lb. popcorn at a beginning moisture of about 13% to 14% by weight. A decontamination step was performed which involved exposing the popcorn kernels to 2000 ppm sodium hypochlorite for 18 minutes. After decontamination, the kernels were soaked in a two-stage process involving an activation stage followed by a steeping stage. The kernels were submerged in water in a steeping tank at a temperature of about 42° C. for about 15 to 60 minutes. Additional water was added to lower the temperature to about 25° C. and the kernels steeped for about 6.5 hours with intermittent mixing for the first 30 minutes. The moisture content of the kernels following soaking was about 31%. Germination was conducted using sprouting trays heaped with kernels. The step was conducted in the dark at a temperature of about 25° C. for about 14 to 16 hours. The germinated kernels were dried to a moisture content of about 14.5 wt. % to about 15.5 wt. % moisture using the same trays used in the germination step. A tray of about 340 pounds was heated at 60° C. for about 2 hours with air flow of about 30,000 CFM. The kernels were mixed every hour. Germinated and dried kernels were packaged as poppable kernels and also as ready to eat (RTE) air-popped popcorn.

Characteristics of the Sprouted Popcorn Kernels and Sprouted Popped Popcorn

Figure 4B:
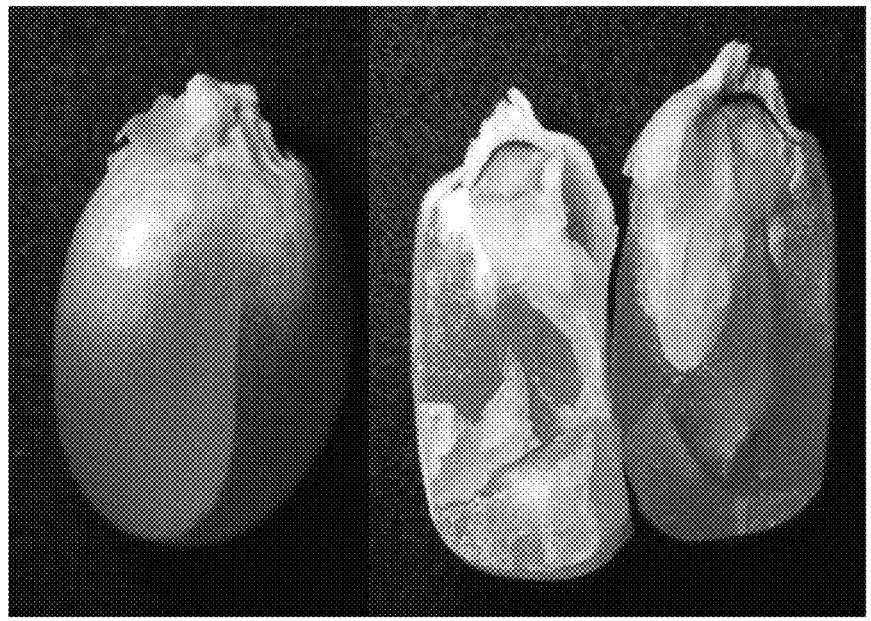
FIG. 4B is a photograph of a sprouted popcorn kernel in whole form (top) and cross section (bottom) prepared in accordance with example implementations of the present disclosure.
Figure 4A:
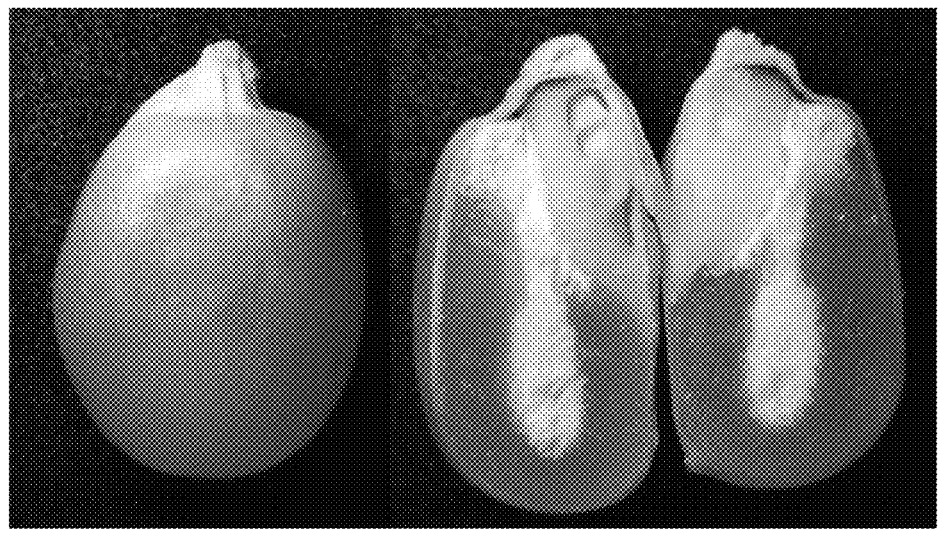
FIG. 4A is a photograph of an unsprouted popcorn kernel in whole form (top) and in cross section (bottom).

Sprouted popcorn kernels prepared in accordance with example implementations of the present disclosure differ in appearance from unsprouted kernels. Specifically, the hull of the sprouted popcorn kernels generally appears thinner and somewhat translucent as compared to a thicker and opaque hull of unsprouted kernels. Referring generally to FIGS. 4A and 4B, specimens of unsprouted kernels and sprouted kernels that have been prepared in accordance with example implementations of the present disclosure are shown. FIG. 4A illustrates unsprouted kernels in whole (top) and in cross-section (bottom) having a moisture content of about 13.5 wt. % and FIG. 4B illustrates sprouted kernels in whole (top) and in cross-section (bottom) having a moisture content of about 14.5 wt. %.

Sprouted popped popcorn prepared from sprouted popcorn kernels in accordance with example implementations of the present disclosure is different from unsprouted popped popcorn in several ways. The volume of sprouted popped popcorn is less than the volume of the unsprouted popped popcorn by around 50% in some cases, and the mass is only slightly less. Accordingly, the density is significantly higher for the sprouted popped popcorn. Color and texture differences are also found, as shown further with respect to Tables 1 and 2.

Figure 5B:
FIG. 5B is a photograph of sprouted popped popcorn prepared in accordance with example implementations of the present disclosure.
Figure 5A:
FIG. 5A is a photograph of unsprouted popped popcorn.
Figure 6:
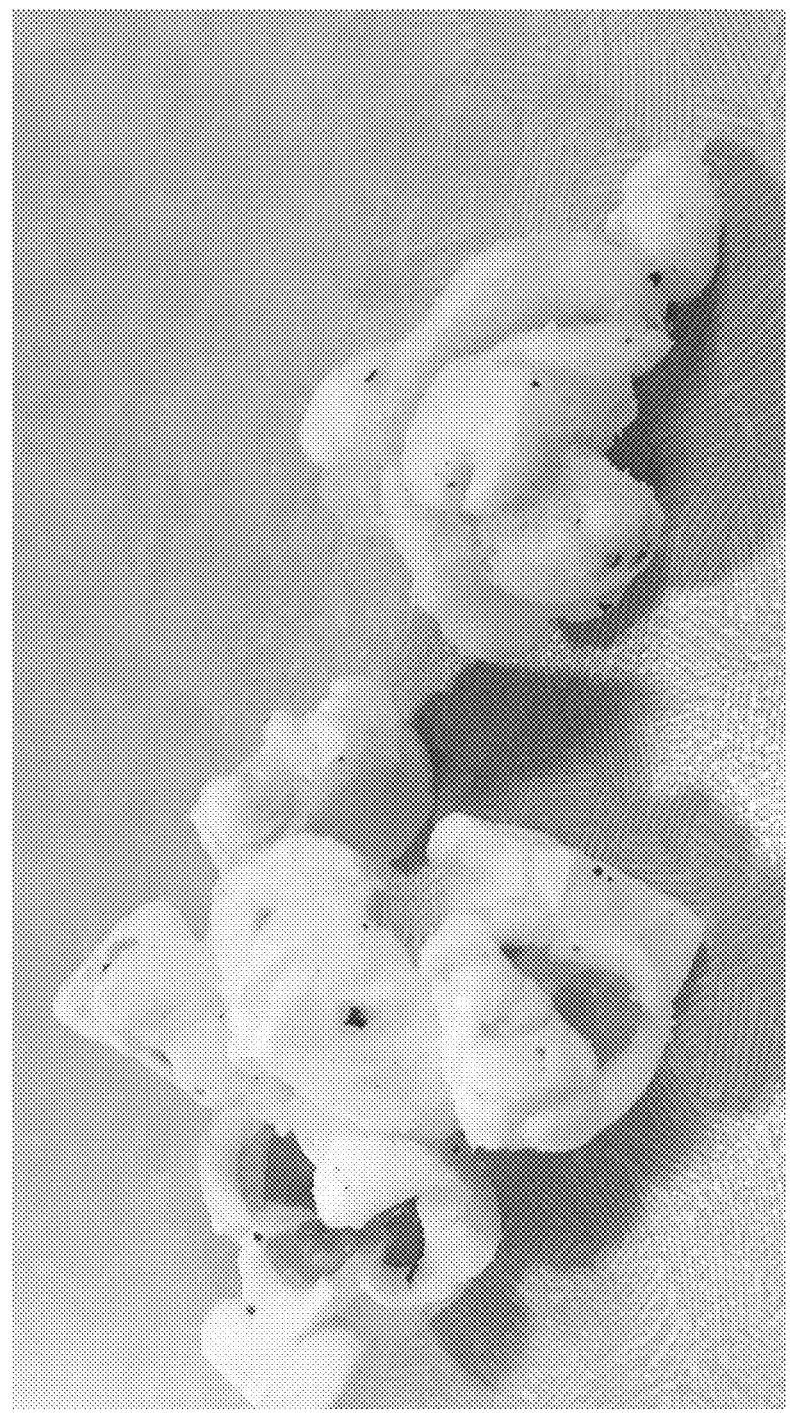
FIG. 6 is a photograph of side by side unsprouted popcorn (left) and popped sprouted popcorn (right) prepared in accordance with example implementations of the present disclosure.
Figure 7:
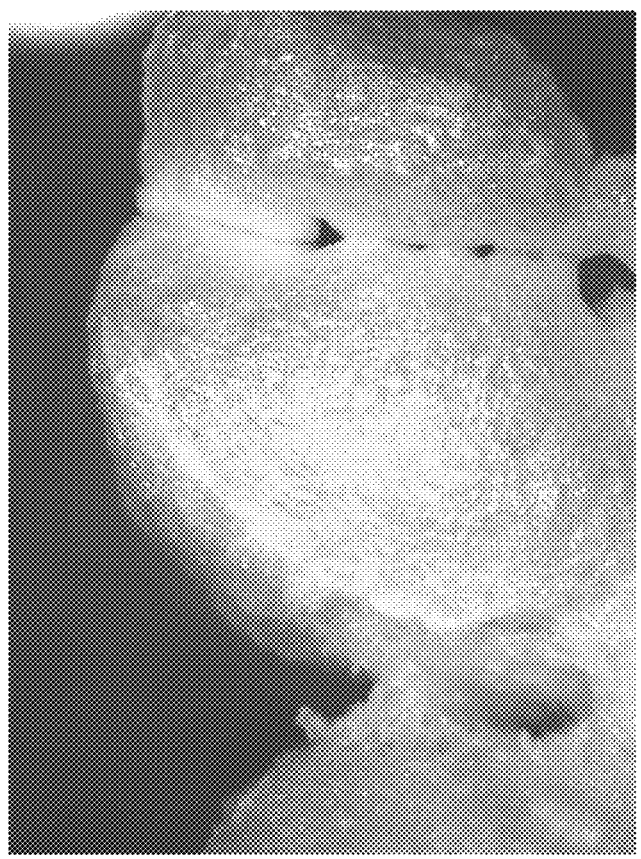
FIG. 7 is a stereo microscopic view of unsprouted popped popcorn (left) and sprouted popped popcorn (right) prepared in accordance with example implementations of the present disclosure.
Figure 7:

Referring generally to FIGS. 5A and 5B, bulk specimens of unsprouted popped popcorn and sprouted popped popcorn prepared in accordance with example implementations of the present disclosure are shown. FIG. 5A illustrates a bulk specimen of unsprouted popped popcorn and FIG. 5B illustrates a bulk specimen of sprouted popped popcorn, where the sprouted popped popcorn has a noticeably higher bulk density as compared to unsprouted popcorn. FIG. 6 illustrates a side by side comparison of a specimen of unsprouted popped popcorn (left) and a specimen of sprouted popped popcorn. Photographs of the specimens of FIG. 6 viewed through a stereo microscope at 8 times magnification are shown in FIG. 7, with the unsprouted popped popcorn (left) having a cracked interior and the sprouted popped popcorn (right) have a webbed appearance with characteristics of a closed-cell foam (e.g., Styrofoam).

Table 1 illustrates qualitative comparisons between sprouted popped popcorn prepared from sprouted popcorn kernels in accordance with example implementations of the present disclosure and unsprouted popped popcorn.

TABLE 1

|  | Sprouted | Unsprouted |
| --- | --- | --- |
| Volume | Low | High |
| Density | High | Low |
| Color | Yellow-tint | White |
| Texture | Crunchy | Soft/chewy |

Table 2 illustrates quantitative comparisons between sprouted popped popcorn prepared from sprouted popcorn kernels in accordance with example implementations of the present disclosure and unsprouted popped popcorn.

TABLE 2

|  | Sprouted | Unsprouted |
| --- | --- | --- |
| Volume from 66 g kernels ml ($cm^3$) | 1350 | 3210 |
| Density (g/$cm^3$) | 0.037 | 0.016 |
| Color L*, a*, b* | 83.78, 3.61, 22.50 | 86.15, 3.24, 19.03 |
| Texture - # peaks | 7 | 23 |
| Texture - peak force (g) | 31899.5 | 24519.5 |

Texture was based on 1.5 g of popped kernels and measured using a TA XT Plus Texture Analyzer and the Exponenet Software (Stable Micro Systems, Version 6,1,7, 0). Volume was measured using a graduated cylinder. Color was measured using a Hunter Colorimeter LabScan XE spectrophotometer.

Conclusion

It is to be understood that embodiments of the present disclosure described above are intended to be merely exemplary. Those skilled in the art will recognize, or be able to ascertain using no more than routine experimentation, numerous equivalents to the specific procedures described herein. All such equivalents are considered to be within the scope of the present disclosure and are covered by the following claims.

It is further contemplated that any embodiment or implementation of the disclosure manifested above as a system or method may include at least a portion of any other embodiment or implementation described herein. Those having skill in the art will appreciate that there are various embodiments or implementations by which systems and methods described herein can be implemented, and that the implementation will vary with the context in which an embodiment of the disclosure is deployed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for producing sprouted popcorn kernels comprising:
a soaking tank sized and dimensioned to receive a charge of at least 100 lbs. of unsprouted popcorn kernels and a volume of soaking fluid sufficient to cover the charge of unsprouted popcorn kernels, the soaking tank configured to hold the charge of unsprouted popcorn kernels in contact with the soaking fluid to provide a moisture content of the charge of unsprouted popcorn kernels by weight from 29% to 35%;
a germination unit coupled with the soaking tank to receive soaked unsprouted popcorn kernels from the soaking tank, the germination unit configured to maintain a relative humidity from 30% to 70% to at least partially germinate the soaked unsprouted popcorn kernels without acrospire formation;
a germination sensor coupled with the germination unit, the germination sensor oriented to detect a germination progress of the at least partially germinated popcorn kernels and generate an output signal in response thereto;
a controller communicatively coupled with the germination sensor to receive the output signal, the controller configured to compare the output signal to reference germination thresholds to determine whether the output signal from the germination sensor meets or exceeds at least one reference germination threshold; and
a drying unit communicatively coupled with the controller, the drying unit configured to dry the sprouted popcorn kernels to a moisture content by weight from 14% to 16% responsive to instructions from the controller when the output signal from the germination sensor meets or exceeds at least one reference germination threshold.

2. The system of claim 1, further comprising a moisture sensor coupled with the soaking tank, the moisture sensor positioned to measure a moisture content of the charge of unsprouted popcorn kernels.

3. The system of claim 2, wherein the controller is communicatively coupled with the moisture sensor, and wherein the controller is configured to initiate transfer of soaked unsprouted popcorn kernels from the soaking tank to the germination unit when the moisture sensor detects a moisture content of the charge of unsprouted popcorn kernels by weight from 29% to 33%.

4. The system of claim 1, wherein the germination unit is configured to produce sprouted popcorn kernels having a moisture content by weight from 30% to 35%.

5. The system of claim 1, wherein the germination sensor includes an optical sensor configured to measure an opacity of a hull of popcorn kernels held within the germination unit, and wherein the reference germination thresholds include a hull opacity measurement prior to acrospire formation.

6. The system of claim 1, wherein the germination sensor includes a moisture sensor configured to measure a moisture content of popcorn kernels held within the germination unit, and wherein the reference germination thresholds include a moisture content of sprouted popcorn kernels prior to acrospire formation.

7. The system of claim 1, wherein the germination sensor includes each of an optical sensor and a moisture sensor, wherein the reference germination thresholds include an optical measurement of sprouted popcorn kernels prior to acrospire formation, and wherein the controller is configured to activate the moisture sensor to detect a moisture content of popcorn kernels held within the germination unit when output from the optical sensor at least substantially matches the optical measurement of sprouted popcorn kernels prior to acrospire formation.

8. The system of claim 1, further comprising a moisture sensor coupled with the drying unit and communicatively coupled with the controller, wherein the controller is configured to instruct the drying unit to stop drying the sprouted popcorn kernels when the moisture content by weight measured by the moisture sensor is from 14% to 16%.

9. The system of claim 1, further including a decontamination unit configured to receive the charge of unsprouted popcorn kernels prior to introduction to the soaking tank, the decontamination unit including an input to receive a decontamination fluid and direct the decontamination fluid to contact the charge of unsprouted popcorn kernels.

10. The system of claim 9, wherein the decontamination fluid includes at least one of sodium hypochlorite (NaOCl) or an organic liquid decontaminating agent.

11. The system of claim 1, wherein the controller is communicatively coupled with the soaking tank to provide an activation step and a steeping step to provide the moisture content of the charge of unsprouted popcorn kernels by weight from 29% to 35%, wherein the activation step includes soaking the charge of unsprouted popcorn kernels in the soaking fluid at a temperature of between 30° C. to 60° C. for a first duration, and wherein the steeping step includes soaking the charge of unsprouted popcorn kernels in the soaking fluid at a temperature of between 20° C. to 30° C. for a second duration greater than the first duration.

12. The system of claim 11, wherein the first duration is from 15 minutes to 120 minutes.

13. The system of claim 12, wherein the second duration is from 4 hours to 8 hours.

14. The system of claim 11, wherein the activation step occurs in the absence of light.

15. The system of claim 14, wherein the steeping step occurs in the presence of light.

16. The system of claim 1, wherein the germination sensor includes each of an optical sensor and a moisture sensor, wherein the reference germination thresholds include an optical measurement of sprouted popcorn kernels prior to acrospire formation, and wherein when the controller determines output from the optical sensor at least substantially matches the optical measurement of sprouted popcorn kernels prior to acrospire formation the controller is configured to determine whether a moisture content of popcorn kernels held within the germination unit detected by the moisture sensor is within a moisture threshold, and wherein the controller is configured to instruct the drying unit to dry the sprouted popcorn kernels when it is determined that each of the optical sensor output and the moisture sensor output are within the respective threshold values.

* * * * *